US012228680B2

(12) United States Patent
Subburaj et al.

(10) Patent No.: US 12,228,680 B2
(45) Date of Patent: *Feb. 18, 2025

(54) METHODS AND APPARATUS TO COMPENSATE FOR RADAR SYSTEM CALIBRATION CHANGES

(71) Applicant: Texas Instruments Incorporated, Dallas, TX (US)

(72) Inventors: Karthik Subburaj, Bangalore (IN); Shankar Narayanamoorthy, Bangalore (IN); Karthik Ramasubramanian, Bangalore (IN); Anand Gadiyar, Bangalore (IN); Dheeraj Kumar Shetty, Bangalore (IN); Shailesh Joshi, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/862,738

(22) Filed: Jul. 12, 2022

(65) Prior Publication Data

US 2023/0204717 A1 Jun. 29, 2023

Related U.S. Application Data

(63) Continuation of application No. 16/513,361, filed on Jul. 16, 2019, now Pat. No. 11,391,815.

(30) Foreign Application Priority Data

Oct. 26, 2018 (IN) .............................. 201841040934

(51) Int. Cl.
*G01S 7/40* (2006.01)

(52) U.S. Cl.
CPC .............. *G01S 7/40* (2013.01); *G01S 7/4008* (2013.01); *G01S 7/4021* (2013.01)

(58) Field of Classification Search
CPC ........ G01S 7/40; G01S 7/4008; G01S 7/4021; G01S 7/4069
See application file for complete search history.

(56) References Cited

U.S. PATENT DOCUMENTS

2012/0170622 A1 7/2012 Ly-Gagnon
2013/0121389 A1 5/2013 Ly-Gagnon
(Continued)

*Primary Examiner* — Timothy X Pham
(74) *Attorney, Agent, or Firm* — Michael T. Gabrik; Frank D. Cimino (57) ABSTRACT

Methods, apparatus, systems and articles of manufacture to compensate radar system calibration are disclosed. A radio-frequency (RF) subsystem having a transmit channel, a receive channel, and a loopback path comprising at least a portion of the transmit channel and at least a portion of the receive channel, a loopback measurer to measure a first loopback response of the RF subsystem for a first calibration configuration of the RF subsystem, and to measure a second loopback response of the RF subsystem for a second calibration configuration of the RF subsystem, and a compensator to adjust at least one of a transmit programmable shifter or a digital front end based on a difference between the first loopback response and the second loopback response to compensate for a loopback response change when the RF subsystem is changed from the first calibration configuration to the second calibration configuration.

20 Claims, 5 Drawing Sheets

(56) References Cited

U.S. PATENT DOCUMENTS

| | | |
|---|---|---|
| 2013/0272175 A1 | 10/2013 | Zargari et al. |
| 2014/0204986 A1 | 7/2014 | Suissa et al. |
| 2017/0090014 A1 | 3/2017 | Subburaj et al. |
| 2019/0049555 A1* | 2/2019 | Sreekiran ............. H01Q 1/3233 |
| 2019/0229803 A1 | 7/2019 | Xu et al. |
| 2019/0363744 A1* | 11/2019 | Oshima ................. H04B 7/086 |
| 2020/0036454 A1 | 1/2020 | Aoki |

* cited by examiner

METHODS AND APPARATUS TO COMPENSATE FOR RADAR SYSTEM CALIBRATION CHANGES

RELATED APPLICATION

This patent application is a continuation of U.S. patent application Ser. No. 16/513,361, filed Jul. 16, 2019, and scheduled to issue Jul. 19, 2022, as U.S. Pat. No. 11,391,815, which claims priority to Indian Provisional Patent Application No. 201841040934, which was filed on Oct. 26, 2018, each of which is hereby incorporated herein by reference in its entirety.

FIELD OF THE DISCLOSURE

This disclosure relates generally to radar systems, and, more particularly, to methods, apparatus, and articles of manufacture to compensate radar system calibration changes.

BACKGROUND

Radar systems use radio frequency (RF) waves to determine the range, angle, and/or velocity of objects.

In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

To mitigate performance degradations resulting from, for example, temperature variations, radar RF/analog subsystem settings are varied based on operating parameters such as temperature. The radar RF/analog subsystem settings can be determined using calibration techniques. However, RF/analog subsystem settings changes resulting from calibration can instantaneously change a loopback response (e.g., a phase response, an amplitude response, etc.) of the radar RF/analog subsystem. Because tracking algorithms rely on phase information across time and/or across sets of chirps, calibration changes and attendant loopback response changes can disturb ongoing object tracking. Thus, calibration cannot be done during operation of some radar systems.

A loopback response represents the change in amount, type, shape, form, etc. of amplitude, phase, etc. a transmit signal undergoes between a first point in a transmit signal path and a second point in a receive signal path. In some examples, the first point is a point at which an analog transmit signal is generated, and the second point is the point at which an analog receive signal is converted to the digital domain. In disclosed examples, the first point and the second point are selected to encompass portions of a transmit path and a receive path that change sufficiently based on calibration changes to warrant compensation. For example, all of a transmit analog signal path and all of a receive analog signal path may be included in a loopback path.

To compensate for RF/analog subsystem response changes resulting from calibration, examples disclosed herein determine: (a) a current loopback response of the RF/analog subsystem for a current calibration, and (b) a new loopback response of the RF/analog subsystem for a new calibration. Differences between the current loopback response and the new loopback response are used to digitally compensate for the RF/analog response changes resulting from calibration changes. Having compensated for the RF/analog subsystem response changes resulting from calibration, the calibration setting can be changed without disturbing ongoing object tracking (e.g., without disturbing and/or resetting tracking filters).

An example digital compensation includes the adjustment of the coefficient(s) of a receive filter, a transmit filter, etc. such as those found in a radar system. In some examples, the coefficient(s) are trained so a particular QPSK symbol is received with a desired amplitude and phase. If a calibration change is made, the same QPSK symbol would instead be received with a different amplitude and phase. The difference(s) in amplitude and phase represent a change in loopback response resulting from the calibration change. An example digital compensation would be a change in the filter coefficient(s) so the same QPSK symbol is to be received with the desired amplitude and phase after the calibration change is made. An example compensation in a radar system modifies the amplitude and/or phase of a receiver output signal by determined amount. For example, by multiplying a receiver output by a factor $A^*\exp(j^*\theta)$ to change the amplitude of the receiver output by an amount A, and the phase of the receiver output by a factor $\theta$ (e.g., expressed in radians, where $2^*\pi$ radians is 360 degrees), and $j=\sqrt{-1}$. Another example compensation in a radar system modifies an amplitude and/or phase of a transmitter output signal by determined amount. For example, a transmitter input signal can be multiplied by a factor $B^*\exp(j^*\theta)$ (e.g., to change the phase of the transmitter output by $\theta$ radians). The multiplications can be carried out in a digital domain, an RF-analog-digital-mixed domain, etc. In the digital domain, the multiplications may be expressed as:

$$(I+j^*Q)^*A^*\exp(j^*\theta)=A^*I^*\cos(\theta)-A^*Q^*\sin(\theta)+j^*A^*Q^*\cos(\theta)+j^*A^*I^*\sin(\theta).$$

where I and Q are, respectively the real and imaginary receiver outputs or transmitter inputs.

In some examples, the loopbacks are performed using an internal transmit (TX) to receive (RX) loopback path in a radar system-on-a-chip (SoC) device. In some examples, the loopbacks are performed across radar SoC devices to compensate for TX and/or common mode path changes. In some examples, the loopbacks are performed in a test mode. In some examples, loopbacks are performed continuously at a known intermediate frequency (IF) frequency above the IF used for object tracking to continuously track changes in the response of the radar RF/analog subsystem.

Reference will now be made in detail to non-limiting examples, some of which are illustrated in the accompanying drawings.

Figure 1A:
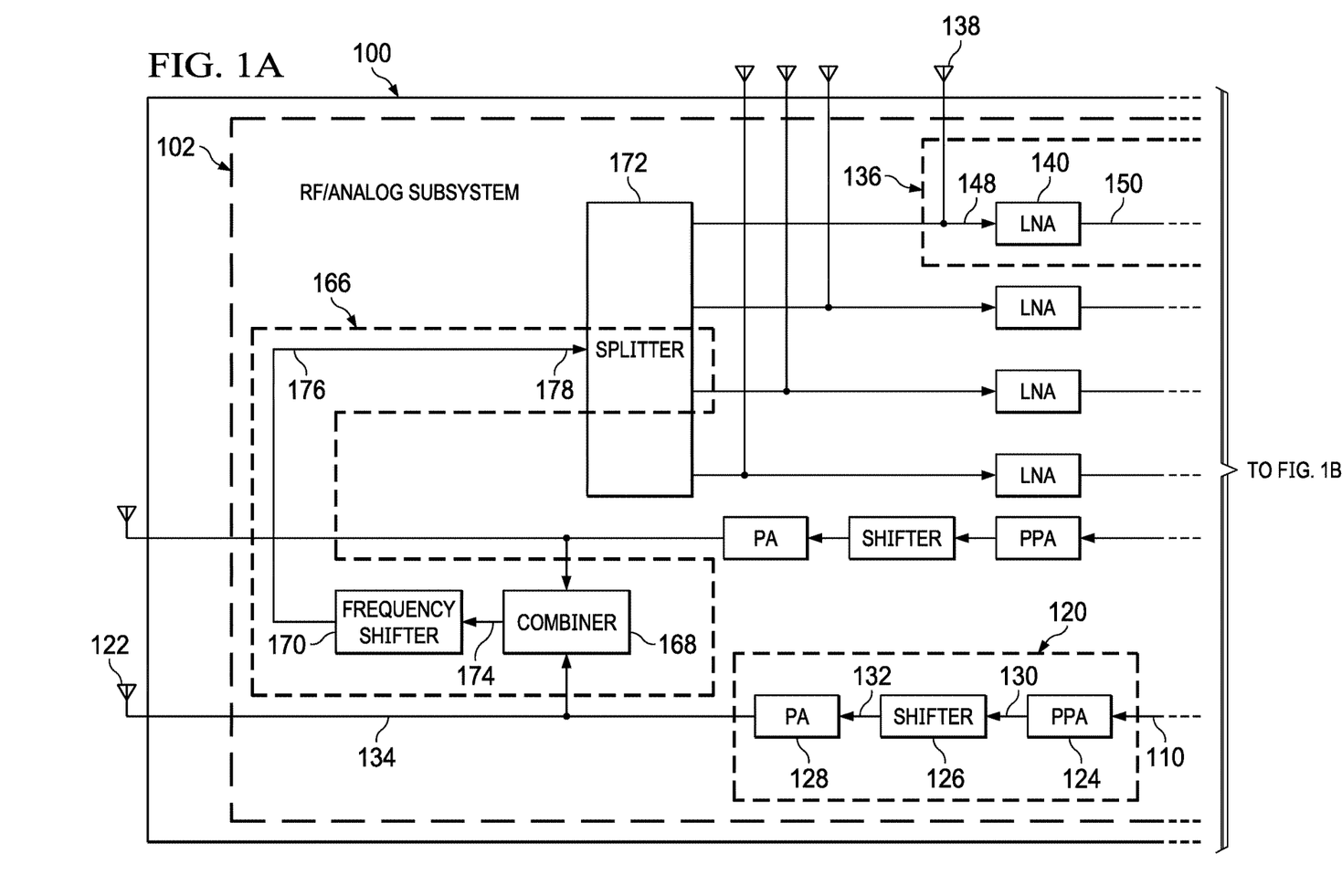
FIGS. 1A and 1B illustrate an example radar system constructed in accordance with teachings of this disclosure.
Figure 1B:
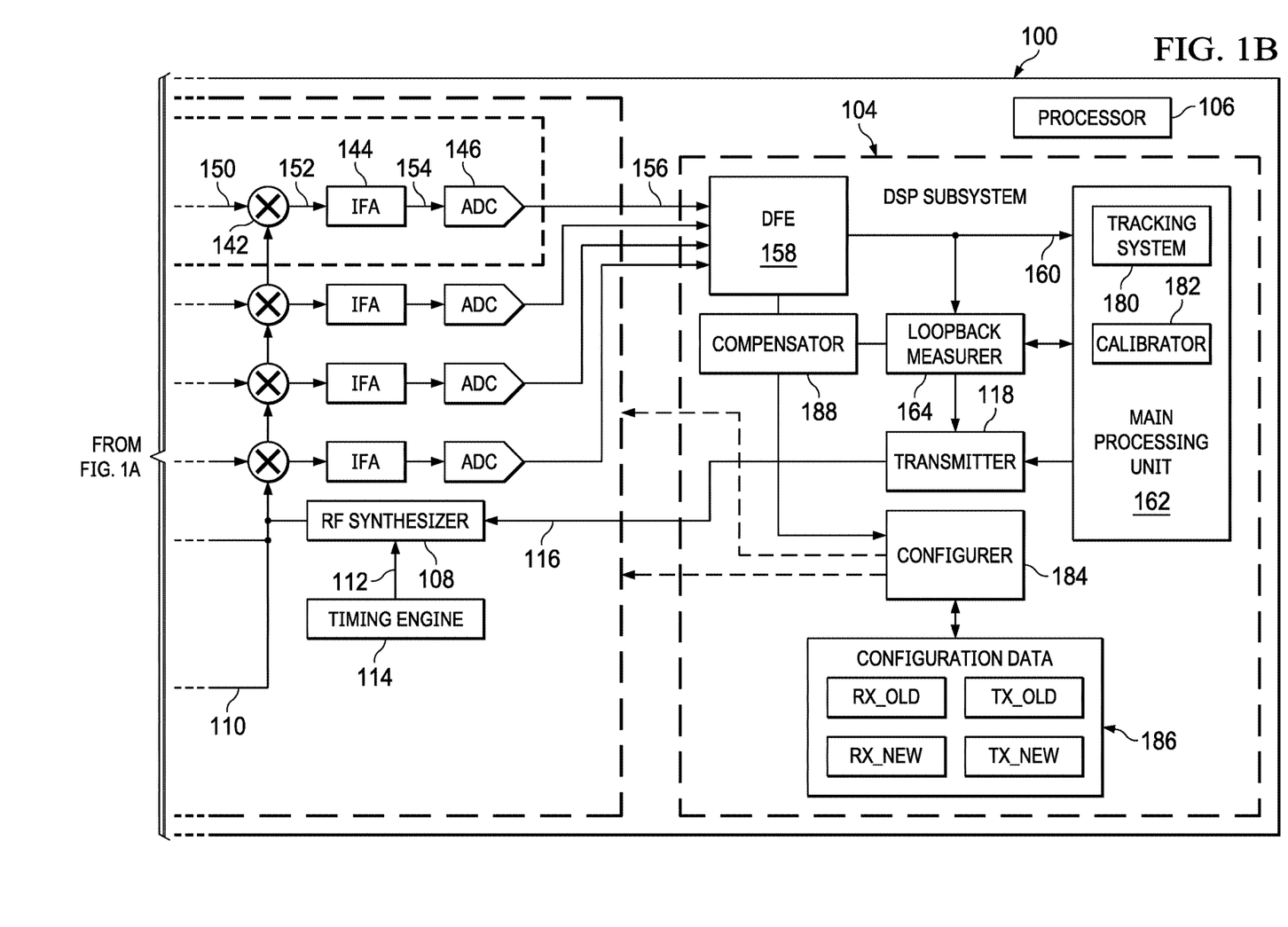

FIGS. 1A and 1B are a block diagram of an example radar system 100 configured to compensate for configuration changes resulting from calibration. The radar system 100 includes an example RF/analog subsystem 102, an example digital signal processor (DSP) subsystem 104, and an example processor 106. In the illustrated example, the RF/analog subsystem 102, and the DSP subsystem 104 are part of a radar SoC device. The processor 106, which may be part of a radar SoC device, is a processor on which a customer can implement customer-specific functionality.

To generate transmit signals, the RF/analog subsystem 102 includes an example RF synthesizer 108. The RF synthesizer 108 of FIG. 1B generates an RF transmit signal 110 from chirp control data 112 received from an example timing engine 114 and, in some examples, from chirp control data 116 received from a transmitter 118. Based on chirp parameter values for a sequence of chirps in a radar frame, the timing engine 114 generates chirp control signals that control the transmission and reception of the chirps in a frame based on the parameter values. In some examples, the RF synthesizer 108 includes a phase locked loop (PLL) and a voltage controlled oscillator (VCO).

To transmit the RF transmit signal 110, the RF/analog subsystem 102 includes one or more transmit channels, one of which is designated at reference numeral 120, and one or more antennas for respective ones of the transmit channels 120, one of which is designated at reference numeral 122. The transmit channels 120 each include an example pre-power amplifier (PPA) 124, an example transmit programmable shifter 126, and an example power amplifier (PA) 128. The PPA 124 of FIG. 1A is coupled to the RF synthesizer 108 of FIG. 1B to receive the RF transmit signal 110, and forms an amplified signal 130. The programmable shifter 126 of FIG. 1A is coupled to the PPA 124 to receive the amplified signal 130, and forms a shifted signal 132. The PA 128 of FIG. 1A is coupled to the programmable shifter 126 to receive the shifted signal 132, and forms a radar transmit signal 134. The radar transmit signal 134 is emitted (e.g., transmitted) by the example antenna 122 of FIG. 1A. In some examples, the programmable shifter 126 is configurable for both frequency and phase shifting. For example, the shifted signal 132 may have a frequency equal to the input frequency of the amplified signal 130 plus a programmable offset frequency, and a phase equal to the input phase of the amplified signal 130 plus a programmable offset phase. In some examples, the transmit signal used to measure a loopback is an RF signal (e.g., near 80 GHz) modulated by a sinusoidal oscillating signal (e.g., near 1 MHz), a square wave signal (e.g., near 1 MHz), etc. Loopback measurements are performed during time intervals when normal transmitting and receiving is performed.

To receive an RF signal, the RF/analog subsystem 102 includes one or more receive channels, one of which is designated at reference numeral 136, and one or more antennas for respective ones of the receive channels 136, one of which is designated at reference numeral 138. The receive channels 136 each include an example low-noise amplifier (LNA) 140, an example mixer 142, an example intermediate frequency amplifier (IFA) 144, and an example analog-to-digital converter (ADC) 146. The LNA 140 of FIG. 1A amplifies a radar return signal 148 received from the antenna 138 of FIG. 1A to form an RF receive signal 150. The mixer 142 of FIG. 1B mixes the RF transmit signal 110 generated by transmission generation circuitry (e.g., the RF synthesizer 108 and the timing engine 114) with the RF receive signal 150 to generate an analog IF output signal 152. The mixer 142 is a down converter that generates the output signal 152 with a frequency equal to the difference between the frequency of the signal 150 received from the LNA 140 and the frequency of the signal 110 received from the transmission generation circuitry, both of which are RF signals. The IFA 144 of FIG. 1B (e.g., a combined bandpass filter (BPF) and variable amplitude amplifier (VAA)) amplifies the analog IF output signal 152 to form an amplified analog IF signal 154. The ADC 146 of FIG. 1B converts the amplified analog IF signal 154 to the digital domain as a digital IF signal 156 (output signal 156 of the ADC 146).

The receive channels 136 are coupled to an example digital front end (DFE) 158 of the example DSP subsystem 104. The DFE 158 of FIG. 1B performs decimation filtering on the digital IF signal 156, DC offset removal, digital compensation of non-idealities in the receive channel 136 (e.g., an inter-RX amplitude imbalance non-ideality, an inter-RX phase imbalance non-ideality, etc.), etc. The DFE 158 transfers decimated digital IF signals 160 to a main processing unit 162 when the radar system 100 is in normal mode. In a loopback mode, the DFE 158 transfers the decimated digital IF signals 160 to an example loopback measurer 164.

To measure loopback responses, the DSP subsystem 104 of FIG. 1B includes the loopback measurer 164. The loopback measurer 164 of FIG. 1B measures the phase and amplitude response of a loopback path. An example loopback path for the radar system 100 includes the transmit channel 120, an example loopback channel 166, and the receive channel 136. The loopback measurer 164 of FIG. 1B implements any number and/or type(s) of methods, algorithms, etc. to determine the response (e.g., amplitude and phase) of the loopback path based on changes to a known RF transmit signal 110 as the RF transmit signal 110 passes through the transmit channel 120, the loopback channel 166, the receive channel 136, and is received as the receive signal 156. Because the loopback measurer 164 receives the RF transmit signal 110 as a reference, the loopback measurer 164 can determine what changes the RF transmit signal 110 underwent prior to becoming the receive signal 156. Example methods and apparatus to measure loopback responses are disclosed in U.S. patent application Ser. No. 14/870,129, entitled "Measurement of Transceiver Performance Parameters In a Radar System," and filed on Sep. 30, 2015. U.S. patent application Ser. No. 14/870,129 is hereby incorporated herein by reference in its entirety.

The loopback channel 166 of FIGS. 1A and 1B includes an example combiner 168, an example frequency shifter 170, and an example splitter 172. The combiner 168 of FIG. 1A receives the shifted signal 134 output by each of the PAs 128, and forms a combined signal 174 from the shifted signals 134. The combiner 168 provides the combined signal 174 to the frequency shifter 170. The frequency shifter 170 of FIG. 1A applies a frequency shift to the combined signal 174 using, for example, an on-off keying (OOK) modulator or a binary phase shift keying (BPSK) modulator to form a shifted combined signal 176. The frequency shifter 170 is coupled to the splitter 172 to provide the shifted combined signal 176 to the splitter 172. The splitter 172 of FIG. 1A is coupled to each of the receive channels 136. The splitter 172 splits the shifted combined signal 176 to provide signals of equal power and phase to each of the receive channels 136. In some examples, the splitter 172 splits the shifted combined signal 176 so the amplitude, attenuation, and/or delay on the signal from the splitter input 178 to the LNAs 140 of each of the receive channels 136 are significantly similar.

To determine the range, angle, and/or velocity of an object, the example DSP subsystem 104 includes an example tracking system 180. The tracking system 180 of FIG. 1B implements any number and/or type(s) of methods, algorithms, etc. to determine the range, angle, and/or velocity of an object based on the radar return signal 148 processed through the receive channel 136. In the illustrated example, the tracking system 180 is implemented as machine readable instructions executed on the main processing unit 162.

To calibrate the RF/analog subsystem 102, the example DSP subsystem 104 includes an example calibrator 182. The example calibrator of FIG. 1B implements any number and/or type(s) of methods, algorithms, etc. to take calibration measurements that characterize the RF/analog subsystem 102 based on the chirp control data 112, 116, and to determine calibration settings for the RF/analog subsystem 102 based on the measurements. The calibrator 182 can compute new calibration settings as temperature changes occur to track temperature-based changes to circuit characteristics. In some examples, the calibrator 182 periodically and/or aperiodically determines calibration settings. Additionally, and/or alternatively, the calibrator 182 determines calibration settings under the control of the main processing unit 162 and/or the processor 106. In the illustrated example, the calibrator 182 is implemented as machine readable instructions executed on the main processing unit 162. In a calibration mode, the DFE 158 transfers the decimated digital IF signals 160 to the calibrator 182.

To configure the RF/analog subsystem 102, the example DSP subsystem includes an example configurer 184. The configurer 184 writes configuration (e.g., calibration) data, parameters, settings, etc. stored in a configuration data store 186 to the RF/analog subsystem 102 to change the configuration of the RF/analog subsystem 102. The configuration data store 186 may be any number and/or type(s) of non-transitory computer-readable storage device or disk.

As shown in FIG. 1B, the configuration data store 186 includes settings for a current (e.g., old) calibration configuration for the transmit channel TX_OLD, a new calibration configuration for the transmit channel TX_NEW, a current (e.g., old) calibration configuration for the receive channel RX_OLD, and a new calibration configuration for the receive channel RX_NEW. The calibration configurations TX_OLD, TX_NEW, RX_OLD and RX_NEW can be determined by the calibrator 182. In examples disclosed herein, calibration configurations may include parameters such as gain and/or phase jumps to be applied. The new calibration configurations TX_NEW and RX_NEW can be associated with a different temperature than the other calibration configurations TX_OLD and RX_OLD.

Changes in configuration (e.g., calibration) data, parameters, settings, etc. applied to the RF/analog subsystem 102 can cause changes (e.g., instantaneous changes) in the responses, characteristics, performance, etc. of the RF/analog subsystem 102. An example configuration change is from a first calibration configuration to a second calibration configuration. Because such changes in calibration configuration can change loopback response, such changes can disrupt the ability to track one or more objects and/or the performance of object tracking performed by the tracking system 180. In some examples, such changes can require a reset of the tracking system 180, which could disrupt the ongoing operation of a system including the radar system 100.

To compensate for changes in the RF/analog subsystem 102 resulting from, for example, calibration changes, the example DSP subsystem 104 includes an example compensator 188. The compensator 188 changes the settings, coefficients, etc. of transmit and/or receive components at a change in calibration configuration so other receive components are not impacted by the change in calibration configuration that occurred. The compensator 188 of FIG. 1B controls the configurer 184 to configure the RF/analog subsystem 102 with a first calibration configuration C1, and controls the loopback measurer 164 to compute a first loopback response L1 for the first calibration configuration C1. The compensator 188 of FIG. 1B then controls the configurer 184 to configure the RF/analog subsystem 102 with a second calibration configuration C2, and controls the loopback measurer 164 to compute a second loopback response L2 for the second calibration configuration C2. The compensator 188 computes the instantaneous change in loopback response by computing, for example, a difference between the loopback response L1 and the loopback response L2. To compensate for the difference, the compensator 188 adjusts the parameters, settings, variables, etc. of the programmable shifters 126, the DFE 158, and/or the tracking system 180. Table 1 shows example combinations to compensate for TX and/or RX calibration configuration changes. For example, to compensate for an RX amplitude and/or phase difference resulting from a calibration change: a first loopback L1 is determined for a TX_OLD, RX_OLD calibration configuration, and a second loopback L2 is determined for a TX_OLD, RX_NEW calibration configuration, and compensation is performed by digitally changing settings of the DFE 158 and/or the tracking system 180 based on a difference of L1 and L2.

TABLE 1

Loopback Configurations

| Configuration | Loopback | RX or TX | Where to compensate |
|---|---|---|---|
| TX_OLD, RX_OLD | L1 | RX $\Delta A$ and/or $\Delta\theta$ | DFE 158, and/or tracking system 180 |
| TX_OLD, RX_NEW | L2 | | |
| TX_OLD, RX_OLD | L1 | TX $\Delta A$ and/or $\Delta\theta$ | Programmable shifters 126, DFE 158, and/or tracking system 180 |
| TX_NEW, RX_OLD | L2 | | |

In some examples, compensation is not applied during loopback measurements and, as a result, the raw analog gain/phase change factors for the section is measured. Example methods and apparatus to measure loopback responses are disclosed in U.S. patent application Ser. No. 14/870,129, entitled "Measurement of Transceiver Performance Parameters In a Radar System," and filed on Sep. 30, 2015. U.S. patent application Ser. No. 14/870,129 is hereby incorporated herein by reference in its entirety.

In some examples, an output 156 of the ADC 146 is expressed as I+jQ, and digital compensation is performed by multiplying the output 156 of the ADC 146 by a compensation factor $A*\exp(j*\theta)$. If the compensation factor was $A_1*\exp(j*\theta_1)$ for a previous (e.g., old) calibration setting, the compensation factor after a calibration setting change would be $A_1*\Delta A*\exp(j*\theta_1+\Delta\theta)$, where $\Delta A$ and $\Delta\theta$ are the amplitude and phase changes, respectively, of the loopback due to the change in calibration. The amplitude change $\Delta A$ is measured in digital amplitude levels, not in power or log-scale. For example, if a first measurement is A1 and a second measurement is A2, then the amplitude difference is A2/A1 and not A2−A1. If instead, log or power scale is used, the amplitude difference may be represented by A2−A1. The phase difference is $\theta_1-\theta_2$. In some examples, the TX compensation can be performed by multiplying the phase shift applied by the TX programmable shifter 126 and an amplitude difference and/or phase difference.

While an example RF/analog subsystem 102 is shown in FIGS. 1A and 1B, RF/analog subsystems according to other architectures having a loopback channel can be used. Other example RF/analog subsystems are disclosed in U.S. patent application Ser. No. 14/870,129, entitled "Measurement of Transceiver Performance Parameters In a Radar System," and filed on Sep. 30, 2015. U.S. patent application Ser. No. 14/870,129 is hereby incorporated herein by reference in its entirety. Further, while two transmit channels 120 and four receive channels 136 are shown in FIGS. 1A and 1B, an RF/analog subsystem may have other numbers of transmit channels and/or receive channels While an example radar system 100 is illustrated in FIGS. 1A and 1B, one or more of the elements, processes and/or devices illustrated in FIGS. 1A and 1B may be combined, divided, re-arranged, omitted, eliminated and/or implemented in any other way. Further, the example RF synthesizer 108, the example timing engine 114, the example transmitter 118, the example transmit channels 120, the example antennas 122, the example PPA 124, the example programmable shifter 126, the example PA 128, the receive channels 136, the example antennas 138, the example LNA 140, the example mixer 142, the example IFA 144, the example ADC 146, the example DFE 158, the example main processing unit 162, the example loopback measurer 164, the example loopback channel 166, the example combiner 168, the example frequency shifter 170, the example splitter 172, the example tracking system 180, the example calibrator 182, the example configurer 184, the example configuration data store 186, the example compensator 188 and/or, more generally, the example radar system 100 of FIGS. 1A and 1B may be implemented by hardware, software, firmware and/or any combination of hardware, software and/or firmware. Thus, for example, any of the example RF synthesizer 108, the example timing engine 114, the example transmitter 118, the example transmit channels 120, the example antennas 122, the example PPA 124, the example programmable shifter 126, the example PA 128, the receive channels 136, the example antennas 138, the example LNA 140, the example mixer 142, the example IFA 144, the example ADC 146, the example DFE 158, the example main processing unit 162, the example loopback measurer 164, the example loopback channel 166, the example combiner 168, the example frequency shifter 170, the example splitter 172, the example tracking system 180, the example calibrator 182, the example configurer 184, the example configuration data store 186, the example compensator 188 and/or, more generally, the example radar system 100 of FIGS. 1A and 1B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example RF synthesizer 108, the example timing engine 114, the example transmitter 118, the example transmit channels 120, the example antennas 122, the example PPA 124, the example programmable shifter 126, the example PA 128, the receive channels 136, the example antennas 138, the example LNA 140, the example mixer 142, the example IFA 144, the example ADC 146, the example DFE 158, the example main processing unit 162, the example loopback measurer 164, the example loopback channel 166, the example combiner 168, the example frequency shifter 170, the example splitter 172, the example tracking system 180, the example calibrator 182, the example configurer 184, the example configuration data store 186, the example compensator 188 and/or the example radar system 100 is/are hereby expressly defined to include a non-transitory computer-readable storage device or storage disk such as a memory, a digital versatile disk (DVD), a compact disc (CD), a compact disc read-only memory (CD-ROM), a Blu-ray disk, etc. including the software and/or firmware. Further still, the example radar system 100 of FIGS. 1A and 1B may include one or more elements, processes and/or devices in addition to, or instead of, those illustrated in FIGS. 1A and 1B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
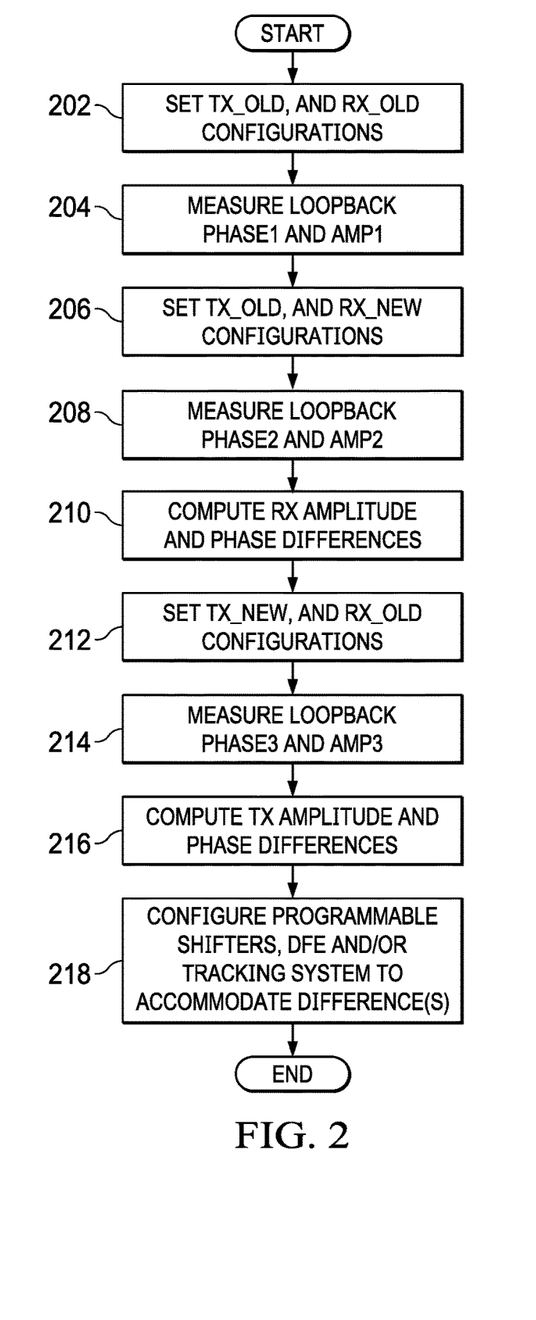
FIG. 2 is a flowchart representative of example hardware logic or machine-readable instructions for implementing the example radar system of FIG. 1 to compensate for radar system calibration changes.

A flowchart representative of example hardware logic, machine-readable instructions, hardware implemented state machines, and/or any combination thereof for implementing the radar system 100 of FIGS. 1A and 1B is shown in FIG. 2. The machine-readable instructions may be an executable program or portion of an executable program for execution by a computer processor such as the processor 502 shown in the example processor platform 500 discussed below in connection with FIG. 5. The program may be embodied in software stored on a non-transitory computer-readable storage medium such as a CD, a CD-ROM, a floppy disk, a hard drive, a DVD, a Blu-ray disk, or a memory associated with the processor 502, but the entire program and/or parts thereof could alternatively be executed by a device other than the processor 502 and/or embodied in firmware or dedicated hardware. Further, although the example program is described with reference to the flowchart illustrated in FIG. 2, many other methods of implementing the example radar system 100 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The program of FIG. 2 begins at block 202, where the configurer 184 configures the RF/analog subsystem 102 with the TX_OLD and the RX_OLD calibration configurations (block 202). The example loopback measurer 164 measures a first loopback, which includes a phase PHASE1 and an amplitude AMP1 (block 204). In FIGS. 1A and 1B the loopback path includes the transmit channel 120, the loopback channel 166, and the receive channel 136. In FIGS. 1A and 1B, the transmit channel 120 is configured to obtain the RF transmit signal 110 to be transmitted through the loopback channel 166, into the receive channel 136, and to be measured by the loopback measurer 164. The configurer 184 configures the RF/analog subsystem 102 with the TX_OLD and the RX_NEW calibration configurations (block 206). The loopback measurer 164 measures a second loopback, which includes a phase PHASE2 and an amplitude AMP2 (block 208). The compensator 188 computes a first phase difference $\Delta\theta\_1=\theta_2-\theta_1$, and a first amplitude difference $\Delta A\_1=A_2/A_1$ (block 210). The configurer 184 configures the RF/analog subsystem 102 with the TX_NEW and the RX_OLD calibration configurations (block 212). The loopback measurer 164 measures a third loopback, which includes a phase $\theta_3$ and an amplitude $A_3$ (block 214). The compensator 188 computes a second phase difference $\Delta\theta\_2=\theta_3-\theta_1$, and a second amplitude difference $\Delta A\_2=A_3/A_1$ (block 216). The compensator 188 compensates for the first phase difference $\Delta\theta\_1$, the first amplitude difference $\Delta A\_1$, the second phase difference $\Delta\theta\_2$, and the second amplitude difference $\Delta A\_2$ by adjusting the parameters, settings, variables, etc. of the programmable shifters 126, the DFE 158, and/or the tracking system 180 (block 218).

While TX and RX amplitude and phase differences can be identified and compensated in the illustrated example of FIG. 1, the radar system 100 may not be able to identify amplitude and/or phase differences on a common mode path.

Figure 3:
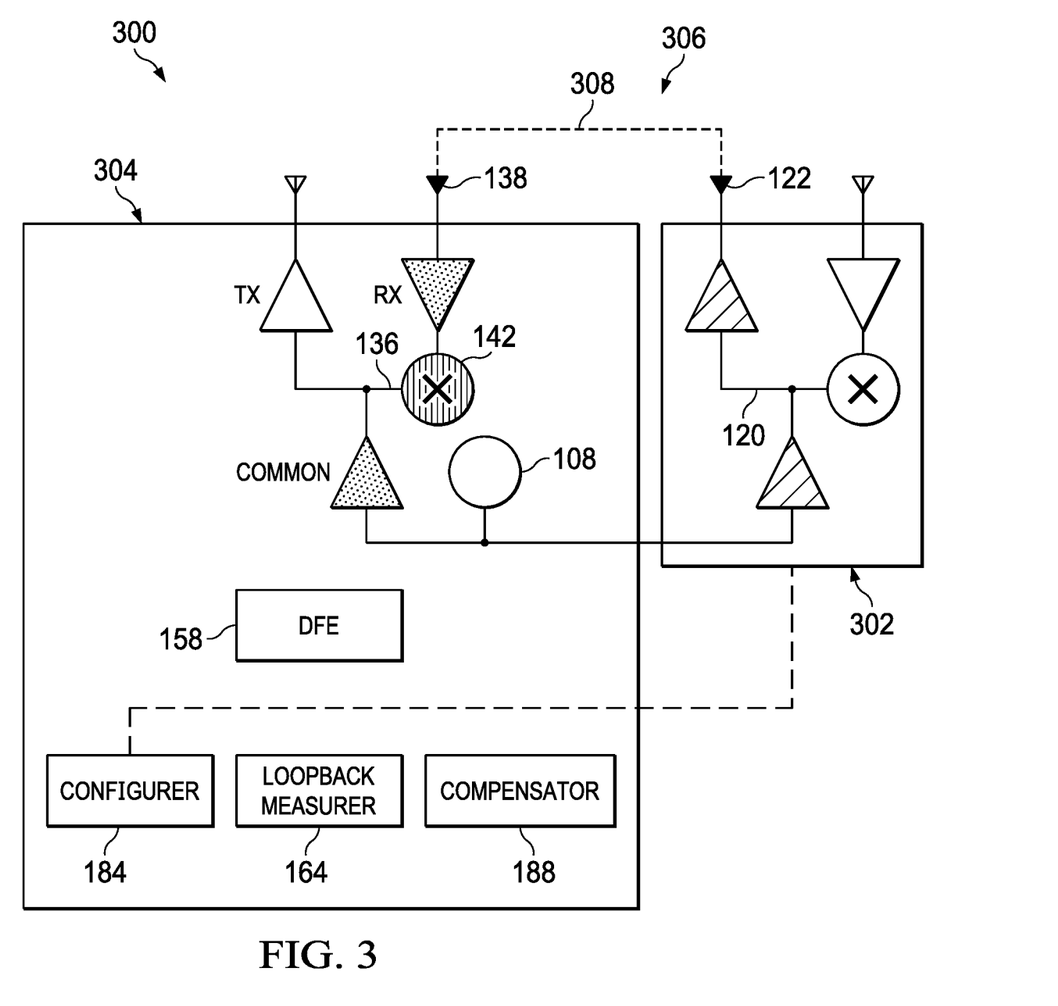
FIG. 3 illustrates another example radar system constructed in accordance with teachings of this disclosure.

FIG. 3 is a block diagram of another radar system 300 constructed in accordance with aspects of this disclosure that can identify amplitude and/or phase differences on a common mode path using antenna coupling between antennae of different radar systems. The example radar system 300 of FIG. 2 includes two separate radar systems 302 and 304, such as two of the radar system 100 of FIGS. 1A and 1B. In the illustrated example of FIG. 3, a loopback channel 306 includes the transmit channel 120 of the radar system 302, a loopback transmission path 308 between the antenna 122 of the radar system 302 and the antenna 138 of the radar system 304, and the receive channel 136 of the radar system 304. The loopback transmission path 308 includes, for example, electro-magnetic coupling, reflections of radar signals by surfaces of a mechanical housing, etc. In the illustrated example, a common local oscillator (e.g., the RF synthesizer 108) is used by the transmit channel 120 of the radar system 302 and by the receive channel 136 of the radar system 304. Use of the common local oscillator enables the loopback measurer 164 to measure a loopback between the radar system 302 and the radar system 304. Using loopback measurements by the loopback measurer 164 enables the compensator 188 to compensate changes in the transmit channel 120 and/or a common mode path. To compensate for the changes, the compensator 188 adjusts the parameters, settings, variables, etc. of the programmable shifters 126, the DFE 158, and/or the tracking system 180.

While an example manner of implementing the radar system 300 is shown in FIG. 3, one or more of the elements, processes and/or devices illustrated in FIG. 3 may be combined, divided, re-arranged, omitted, eliminated and/or implemented in any other way. Further, the example RF synthesizer 108, the example radar systems 302 and 304, the example transmit channel 120, the example receive channel 136, the example mixer 142, the example DFE 158, the example loopback measurer 164, the example configurer 184, the example compensator 188 and/or, more generally, the example radar system 300 of FIG. 3 may be implemented by hardware, software, firmware and/or any combination of hardware, software and/or firmware. Thus, for example, any of the example RF synthesizer 108, the example radar systems 302 and 304, the example transmit channel 120, the example receive channel 136, the example mixer 142, the example DFE 158, the example loopback measurer 164, the example configurer 184, the example compensator 188 and/or, more generally, the example radar system 300 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example RF synthesizer 108, the example radar systems 302 and 304, the example transmit channel 120, the example receive channel 136, the example mixer 142, the example DFE 158, the example loopback measurer 164, the example configurer 184, the example compensator 188, and/or the example radar system 300 is/are hereby expressly defined to include a non-transitory computer-readable storage device or storage disk such as a memory, a DVD, a CD, a CD-ROM, a Blu-ray disk, etc. including the software and/or firmware. Further still, the example radar system 300 of FIG. 3 may include one or more elements, processes and/or devices in addition to, or instead of, those illustrated in FIG. 4, and/or may include more than one of any or all of the illustrated elements, processes and devices.

Figure 4:
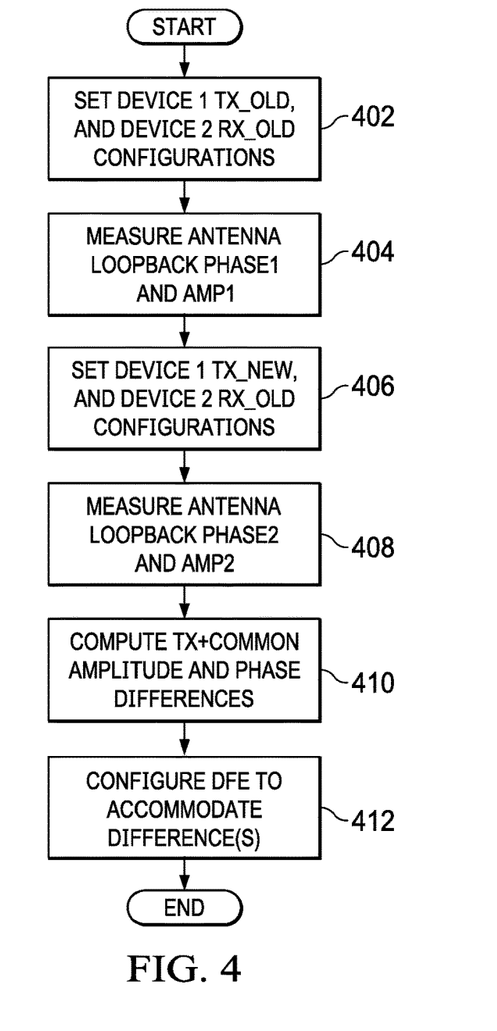
FIG. 4 is a flowchart representative of example hardware logic or machine-readable instructions for implementing the example radar system of FIG. 3 to compensate for radar system calibration changes.

A flowchart representative of example hardware logic, machine-readable instructions, hardware implemented state machines, and/or any combination thereof for implementing the radar system 300 of FIG. 3 is shown in FIG. 4. The machine-readable instructions may be an executable program or portion of an executable program for execution by a computer processor such as the processor 502 shown in the example processor platform 500 discussed below in connection with FIG. 5. The program may be embodied in software stored on a non-transitory computer-readable storage medium such as a CD, a CD-ROM, a floppy disk, a hard drive, a DVD, a Blu-ray disk, or a memory associated with the processor 502, but the entire program and/or parts thereof could alternatively be executed by a device other than the processor 502 and/or embodied in firmware or dedicated hardware. Further, although the example program is described with reference to the flowchart illustrated in FIG. 4, many other methods of implementing the example radar system 300 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an op-amp, a logic circuit, etc.) structured to perform the corresponding operation without executing software or firmware.

The program of FIG. 4 begins at block 402, where the configurer 184 configures the radar system 302 with the TX_OLD calibration configuration, and configures the radar system 304 with the RX_OLD calibration configuration (block 402). The loopback measurer 164 measures a first loopback, which includes a phase $\theta_1$ and an amplitude $A_1$ (block 404). In FIG. 3 the loopback path includes the transmit channel 120 of the radar system 302, the loopback transmission path 308 between the antenna 122 of the radar system 302 and the antenna 138 of the radar system 304, and the receive channel 136 of the radar system 304. The configurer 184 configures the radar system 302 with the TX_NEW calibration configuration, and configures the radar system 304 with the RX_OLD calibration configuration (block 406). The loopback measurer 164 measures a second loopback, which includes a phase $\theta_2$ and an amplitude AMP2 (block 408). The compensator 188 computes a phase difference $\Delta\theta=\theta_2-\theta_1$, and an amplitude difference $\Delta A=A_2-A_1$ (block 410). The compensator 188 compensates for the phase difference $\Delta\theta$, and the amplitude difference $\Delta A$ by adjusting the parameters, settings, variables, etc. of the DFE 158 (block 412).

In examples disclosed herein, phase correction for TX involves compensating the shift in phase at TX path (say $\theta_{new}-\theta_{old}$) by adding this to the existing phase shifter correction ($\theta_{exist}$). Therefore, the new correction to be configured is $\theta_{exist}+\theta_{new}-\theta_{old}$. Phase correction at RX involves compensating the shift in phase at RX path in a manner similar to the TX case. However, in some examples, such RX path correction is applied digitally at the DFE 158 (e.g., after ADC samples are recorded). A gain correction $\Delta A_{new}=A_{old}/A_{new}$ is also applied. In some examples, such gain correction is processed digitally (e.g., at the DFE 158). The transformed ADC data is then computed as ADC_data*$\Delta A_{exist}$*$\Delta A_{new}$*exp(j($\theta_{exist}+\theta_{new}-\theta_{old}$)). The amplitude shift is corrected at the TX power backoff in dB by adding (or subtracting) the delta change in power during a settings update.

As mentioned above, the example processes of FIGS. 2 and 4 may be implemented using executable instructions (e.g., computer and/or machine-readable instructions) stored on a non-transitory computer and/or machine-readable medium such as a hard disk drive, a flash memory, a read-only memory, a CD, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
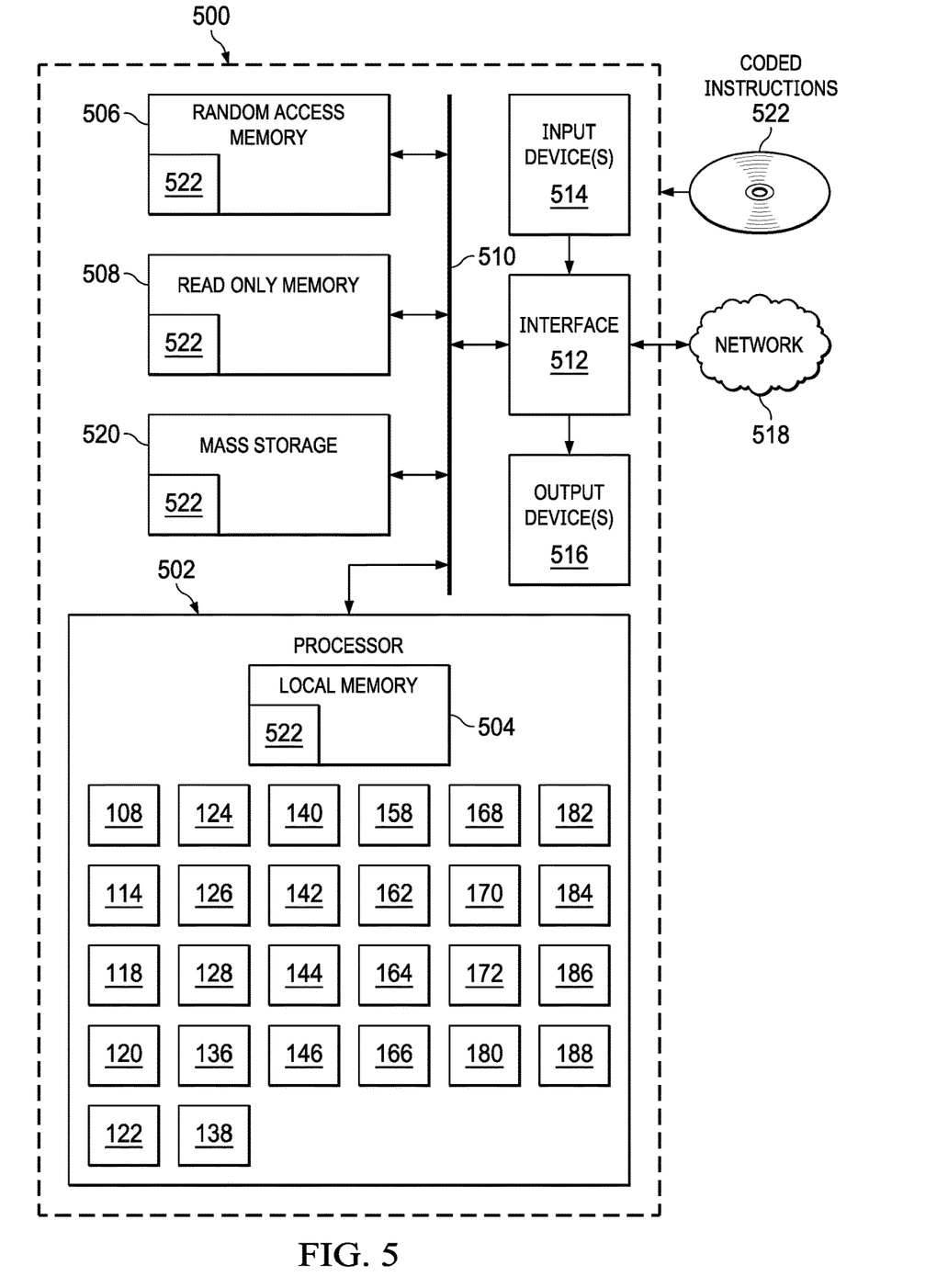
FIG. 5 illustrates an example processor platform structured to execute the example machine-readable instructions of FIG. 2 and/or FIG. 4 to implement the example radar systems of FIG. 1 and/or FIG. 3.

FIG. 5 is a block diagram of an example processor platform 500 structured to execute the instructions of FIGS. 2 and 3 to implement the radar system 100 of FIGS. 1A and 1B, and the radar systems 300, 302 and 304 of FIG. 3. The processor platform 500 can be, for example, an automobile, a server, a personal computer, a workstation, a mobile device (e.g., a cell phone, a smart phone, a tablet such as an IPAD™), a headset or other wearable device, or any other type of computing device implementing radar.

The processor platform 500 of the illustrated example includes a processor 502. The processor 502 of the illustrated example is hardware. For example, the processor 502 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example RF synthesizer 108, the example timing engine 114, the example transmitter 118, the example transmit channels 120, the example antennas 122, the example PPA 124, the example programmable shifter 126, the example PA 128, the receive channels 136, the example antennas 138, the example LNA 140, the example mixer 142, the example IFA 144, the example ADC 146, the example DFE 158, the example main processing unit 162, the example loopback measurer 164, the example loopback channel 166, the example combiner 168, the example frequency shifter 170, the example splitter 172, the example tracking system 180, the example calibrator 182, the example configurer 184, the example configuration data store 186, and the example compensator 188.

The processor 502 of the illustrated example includes a local memory 504 (e.g., a cache). The processor 502 of the illustrated example is in communication with a main memory including a volatile memory 506 and a non-volatile memory 508 via a bus 510. The volatile memory 506 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 508 may be implemented by flash memory and/or any other desired type of memory device. Access to the main memory 506, 508 is controlled by a memory controller.

The processor platform 500 of the illustrated example also includes an interface circuit 512. The interface circuit 512 may be implemented by any type of interface standard, such as an Ethernet interface, a universal serial bus (USB), a Bluetooth® interface, a near field communication (NFC) interface, and/or a peripheral component interface (PCI) express interface.

In the illustrated example, one or more input devices 514 are connected to the interface circuit 512. The input device(s) 514 permit(s) a user to enter data and/or commands into the processor 502. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 516 are also connected to the interface circuit 512 of the illustrated example. The output devices 516 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 512 of the illustrated example, thus, typically includes a graphics driver card, a graphics driver chip and/or a graphics driver processor.

The interface circuit 512 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 518. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 520 for storing software and/or data. Examples of such mass storage devices 520 include floppy disk drives, hard drive disks, CD drives, Blu-ray disk drives, redundant array of independent disks (RAID) systems, and DVD drives.

Coded instructions 522 including the coded instructions of FIGS. 2 and 4 may be stored in the mass storage device 520, in the volatile memory 506, in the non-volatile memory 508, and/or on a removable non-transitory computer-readable storage medium such as a CD-ROM or a DVD.

From the foregoing, it will be appreciated that example methods, apparatus and articles of manufacture have been disclosed that compensate for RF/analog TX and RX changes resulting from calibration configuration changes. From the foregoing, it will be appreciated that methods, apparatus and articles of manufacture have been disclosed which enhance the operations of a computer by allowing object tracking and/or customer algorithms to be performed without interruption resulting from calibration changes. The disclosed methods, apparatus and articles of manufacture improve the efficiency of using a computing device by maintaining phase coherence across calibration intervals using internal loopbacks and/or loopbacks across cascaded radar devices. Moreover, performance of location and/or velocity tracking systems is improved as a result of the improved phase coherency across tracked frames. Furthermore, example methods, apparatus, and/or articles of manufacture disclosed herein identify and overcome inaccuracies and inability in the prior art to perform object tracking. The disclosed methods, apparatus and articles of manufacture are accordingly directed to one or more improvement(s) in the functioning of a computer.

Example methods, apparatus, and articles of manufacture to compensate radar system calibration changes are disclosed herein. Further examples and combinations thereof include at least the following.

Example 1 comprises a radar system, comprising a radio-frequency (RF) subsystem having a transmit channel, a receive channel, and a loopback path comprising at least a portion of the transmit channel and at least a portion of the receive channel, a loopback measurer to measure a first loopback response of the RF subsystem for a first calibration configuration of the RF subsystem, and to measure a second loopback response of the RF subsystem for a second calibration configuration of the RF subsystem, and a compensator to adjust at least one of a transmit programmable shifter or a digital front end based on a difference between the first loopback response and the second loopback response to compensate for a loopback response change when the RF subsystem is changed from the first calibration configuration to the second calibration configuration.

Example 2 comprises the radar system of example 1, wherein the radar system is a system-on-a-chip device.

Example 3 comprises the radar system of example 2, wherein the first calibration configuration of the RF subsystem comprises a current calibration configuration of the transmit channel, and a current calibration configuration of the receive channel, the second calibration configuration is the current calibration configuration of the transmit channel, and a new calibration configuration of the receive channel, and the difference between the first loopback response and the second loopback response represents a change in the receive channel.

Example 4 comprises the radar system of example 2, wherein the first calibration configuration of the RF subsystem comprises a current calibration configuration of the transmit channel, and a current calibration configuration of the receive channel, the second calibration configuration is a new calibration configuration of the transmit channel, and the current calibration configuration of the receive channel, and the difference between the first loopback response and the second loopback response represents a change in the transmit channel.

Example 5 comprises the radar system of example 1, wherein the radar system comprises a first radar system-on-a-chip device that includes the transmit channel and a second radar system-on-a-chip device that includes the receive channel.

Example 6 comprises the radar system of example 5, wherein the first calibration configuration of the RF subsystem is a current calibration configuration of the transmit channel of the first radar system-on-a-chip device, and a current calibration configuration of the receive channel of the second radar system-on-a-chip device, the second calibration configuration of the RF subsystem is a new calibration configuration of the transmit channel of the first radar system-on-a-chip device, and the current calibration configuration of the receive channel of the second radar system-on-a-chip device, and the difference between the first loopback response and the second loopback response represents a change in at least one of the transmit channel of the first radar system-on-a-chip device, or a common mode path.

Example 7 comprises the radar system of example 6, wherein the compensator is to adjust the digital front end based on the difference between the first loopback response and the second loopback response.

Example 8 comprises the radar system of example 1, wherein the compensator adjusts the at least one of the transmit programmable shifter or the digital front end corresponding to multiplying a signal and the loopback response change.

Example 9 comprises the radar system of example 1, wherein the receive channel comprises a low-noise amplifier, a mixer, an intermediate frequency amplifier, and an analog-to-digital converter.

Example 10 comprises the radar system of example 1, wherein the transmit channel comprises an RF synthesizer, a programmable shifter, and a power amplifier.

Example 11 comprises the radar system of example 1, wherein the loopback path comprises a combiner, a frequency shifter, and a splitter.

Example 12 comprises a method, comprising measuring a first loopback response of a radio-frequency (RF) subsystem for a first calibration configuration of the RF subsystem, measuring a second loopback response of the RF subsystem for a second calibration configuration of the RF subsystem, and adjusting at least one of a transmit programmable shifter or a digital front end based on a difference between the first loopback response and the second loopback response to compensate for a loopback response change when the RF subsystem is changed from the first calibration configuration to the second calibration configuration.

Example 13 comprises the method of example 12, wherein the first calibration configuration of the RF subsystem comprises a current calibration configuration of a transmit channel, and a current calibration configuration of a receive channel, the second calibration configuration is the current calibration configuration of the transmit channel, and a new calibration configuration of the receive channel, and the difference between the first loopback response and the second loopback response represents a change in the receive channel.

Example 14 comprises the method of example 12, wherein the first calibration configuration of the RF subsystem comprises a current calibration configuration of a transmit channel, and a current calibration configuration of a receive channel, the second calibration configuration is a new calibration configuration of the transmit channel, and the current calibration configuration of the receive channel, and the difference between the first loopback response and the second loopback response represents a change in the transmit channel.

Example 15 comprises the method of example 12, wherein the first calibration configuration of the RF subsystem is a current calibration configuration of a transmit channel of a first system-on-a-chip device, and a current calibration configuration of a receive channel of a second system-on-a-chip device, the second calibration configuration of the RF subsystem is a new calibration configuration of the transmit channel of the first system-on-a-chip device, and the current calibration configuration of the receive channel of the second system-on-a-chip device, and the difference between the first loopback response and the second loopback response represents a change in the transmit channel and a common mode path.

Example 16 comprises the method of example 12, wherein the first calibration configuration of the RF subsystem is a current calibration configuration of a transmit channel of a first system-on-a-chip device, and a current calibration configuration of a receive channel of a second system-on-a-chip device, the second calibration configuration of the RF subsystem is the current calibration configuration of the transmit channel of the first system-on-a-chip device, and a new calibration configuration of the receive channel of the second system-on-a-chip device, and the difference between the first loopback response and the second loopback response represents a change in the receive channel.

Example 17 comprises the method of example 12, wherein adjusting the at least one of a transmit programmable shifter or a digital front end based on a difference between the first loopback response and the second loopback response comprises multiplying at least one of a transmit signal or a receive signal, and the loopback response change.

Example 18 comprises a non-transitory computer-readable storage medium comprising instructions that, when executed, cause a machine to at least measure a first loopback response of a radio-frequency (RF) subsystem for a first calibration configuration of the RF subsystem, measure a second loopback response of the RF subsystem for a second calibration configuration of the RF subsystem, and adjust at least one of a transmit programmable shifter or a digital front end based on a difference between the first loopback response and the second loopback response to compensate for a loopback response change when the RF subsystem is changed from the first calibration configuration to the second calibration configuration.

Example 19 comprises the non-transitory computer-readable storage medium of example 18, wherein the first calibration configuration of the RF subsystem comprises a current calibration configuration of a transmit channel, and a current calibration configuration of a receive channel, the second calibration configuration is the current calibration configuration of the transmit channel, and a new calibration configuration of the receive channel, and the difference between the first loopback response and the second loopback response represents a change in the receive channel.

Example 20 comprises the non-transitory computer-readable storage medium of example 18, wherein the first calibration configuration of the RF subsystem comprises a current calibration configuration of a transmit channel, and a current calibration configuration of a receive channel, the second calibration configuration is a new calibration configuration of the transmit channel, and the current calibration configuration of the receive channel, and the difference between the first loopback response and the second loopback response represents a change in the transmit channel.

Example 21 comprises the non-transitory computer-readable storage medium of example 18, wherein the first calibration configuration of the RF subsystem is a current calibration configuration of a transmit channel of a first system-on-a-chip device, and a current calibration configuration of a receive channel of a second system-on-a-chip device, the second calibration configuration of the RF subsystem is a new calibration configuration of the transmit channel of the first system-on-a-chip device, and the current calibration configuration of the receive channel of the second system-on-a-chip device, and the difference between the first loopback response and the second loopback response represents a change in at least one of the transmit channel, or a common mode path. It is noted that this patent claims priority to Indian Provisional Patent Application Serial No. 201841040934, which was filed on Oct. 26, 2018, and is hereby incorporated by reference in its entirety.

Any references, comprising publications, patent applications, and patents cited herein are hereby incorporated in their entirety by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A radar system comprising:
a transmit channel including a programmable shifter;
a receive channel;
a loopback path including at least a portion of the transmit channel and at least a portion of the receive channel;
a loopback measurer configured to:
measure a first loopback response for a first configuration of the transmit and receive channels, wherein, in the first configuration, one of the transmit and receive channels has a current configuration and the other of the transmit and receive channels has a new configuration; and
measure a second loopback response for a second configuration of the transmit and receive channels, wherein, in the second configuration, one of the transmit and receive channels has a different configuration than in the first configuration and the other of the transmit and receive channels has the same configuration as in the first configuration; and
a compensator configured to adjust the programmable shifter based on a difference between the first loopback response and the second loopback response.

2. The radar system of claim 1, further comprising a digital front end coupled to the receive channel,
wherein the compensator is further configured to adjust, based on the difference between the first and second loopback responses, the programmable shifter and the digital front end.

3. The radar system of claim 1,
wherein the loopback measurer is configured to measure the first loopback response by at least measuring a first phase,
wherein the loopback measurer is configured to measure the second loopback response by at least measuring a second phase, and
wherein the compensator is configured to adjust the programmable shifter based on an arithmetic difference between the second phase and the first phase.

4. The radar system of claim 1,
wherein the loopback measurer is configured to measure the first loopback response by at least measuring a first amplitude,
wherein the loopback measurer is configured to measure the second loopback response by at least measuring a second amplitude, and
wherein the compensator is configured to adjust the programmable shifter based on a ratio of the second amplitude and the first amplitude.

5. The radar system of claim 1,
wherein the difference is a first difference,
wherein the loopback measurer is further configured to measure a third loopback response for a third configuration of the transmit and receive channels, and
wherein the compensator is configured to adjust the programmable shifter further based on a second difference between the first loopback response and the third loopback response.

6. The radar system of claim 1, further comprising a configurer configured to:
set the transmit and receive channels to the first configuration before the loopback measurer measures the first loopback response; and
set the transmit and receive channels to the second configuration before the loopback measurer measures the second loopback response.

7. The radar system of claim 1, wherein the transmit channel is configured to transmit a radar frame using the adjusted programmable shifter.

8. The radar system of claim 1,
wherein the radar system comprises a system-on-a-chip device, and
wherein the loopback path, the loopback measurer, and the compensator are part of the system-on-a-chip device.

9. The radar system of claim 1, further comprising:
a first radar system-on-a-chip device including the transmit channel; and
a second radar system-on-a-chip device including the receive channel.

10. The radar system of claim 1, further comprising a digital front end coupled to the receive channel,
wherein the receive channel comprises a low-noise amplifier, a mixer, an intermediate frequency amplifier, and an analog-to-digital converter,
wherein the analog-to-digital converter includes an output coupled to the digital front end.

11. The radar system of claim 1, wherein the transmit channel further comprises a radio-frequency synthesizer and a power amplifier.

12. The radar system of claim 1, wherein the loopback path comprises a combiner, a frequency shifter, and a splitter.

13. A method comprising:
measuring, by a digital signal processor (DSP), a first loopback response of a radio-frequency (RF) subsystem coupled to the DSP for a first configuration of the RF subsystem having a transmit channel and a receive channel, wherein, in the first configuration, one of the transmit and receive channels has a current configuration and the other of the transmit and receive channels has a new configuration;
measuring, by the DSP, a second loopback response of the RF subsystem for a second configuration of the RF subsystem, wherein, in the second configuration, one of the transmit and receive channels has a different configuration than in the first configuration and the other of the transmit and receive channels has the same configuration as in the first configuration;
adjusting, by the DSP, a programmable shifter in a transmit channel of the RF subsystem based on a difference between the first loopback response and the second loopback response; and
transmitting, by the RF subsystem, a radar frame using the adjusted programmable shifter.

14. The method of claim 13, further comprising adjusting, based on the difference between the first and second loopback responses, the programmable shifter and a digital front end coupled to a receive channel of the RF subsystem.

15. The method of claim 13,
wherein measuring the first loopback response comprises measuring a first phase,
wherein measuring the second loopback response comprises measuring a second phase, and
wherein adjusting the programmable shifter is based on an arithmetic difference between the second phase and the first phase.

16. The method of claim 13,
wherein measuring the first loopback response comprises measuring a first amplitude, wherein measuring the second loopback response comprises measuring a second amplitude, and wherein adjusting the programmable shifter is based on a ratio between the second amplitude and the first amplitude.

17. The method of claim 13, further comprising:

setting the RF subsystem to the first configuration before measuring the first loopback response; and set the RF subsystem to the second configuration before measuring the second loopback response.

18. A radar system comprising:

a transmit channel;

a receive channel;

a loopback path including at least a portion of the transmit channel and at least a portion of the receive channel;

a digital front end coupled to the receive channel;

a loopback measurer configured to:

measure a first loopback response for a first configuration of the transmit and receive channels, wherein, in the first configuration, one of the transmit and receive channels has a current configuration and the other of the transmit and receive channels has a new configuration; and measure a second loopback response for a second configuration of the transmit and receive channels, wherein, in the second configuration, one of the transmit and receive channels has a different configuration than in the first configuration and the other of the transmit and receive channels has the same configuration as in the first configuration; and a compensator configured to adjust the digital front end based on a difference between the first loopback response and the second loopback response.

19. The radar system of claim 18, wherein the loopback measurer is configured to measure the first loopback response by at least measuring a first phase, wherein the loopback measurer is configured to measure the second loopback response by at least measuring a second phase, and wherein the compensator is configured to adjust the digital front end based on an arithmetic difference between the second phase and the first phase.

20. The radar system of claim 18, wherein the loopback measurer is configured to measure the first loopback response by at least measuring a first amplitude, wherein the loopback measurer is configured to measure the second loopback response by at least measuring a second amplitude, and wherein the compensator is configured to adjust the digital front end based on a ratio of the second amplitude and the first amplitude.

* * * * *